3,193,387
STABILIZATION OF MALT BEVERAGES WITH BILE AND COMPOUNDS THEREOF
Edward Segel and Paul Robson Glenister, Chicago, Ill., assignors to J. E. Siebel Sons' Company, Inc., Chicago, Ill., a corporation of Illinois
No Drawing. Filed July 23, 1962, Ser. No. 211,839
4 Claims. (Cl. 99—48)

This invention relates to the improvement of the stability of malt beverages, when packages of such beverages are opened.

More specifically, this invention relates to the substantial prevention or inhibition of "gushing" in fermented malt beverages such as beer, ale, and the like.

Fermented malt beverages contain gas, principally carbon dioxide, in solution. In the finished package used by the consumer, the amount of dissolved carbon dioxide is greater than that in equilibrium with the atmosphere. Normally, such packages are under a gauge pressure in the range of 25-50 pounds per square inch, at normal room temperature, the solubility of the carbon dioxide being maintained by means of a gas-tight closure which prevents escape of carbon dioxide.

When a package is opened, as by removing the crown from a bottle or puncturing a hole in a can, this excess pressure is released. Immediately, the amount of carbon dioxide dissolved in the beer exceeds that present under conditions of equilibrium. After opening, beer is supersaturated in carbon dioxide. In order to reach equilibrium, carbon dioxide must be liberated to the atmosphere.

Normally, when a bottle or can of beer is opened, such equilibrium by release of carbon dioxide is attained slowly and gently. Carbon dioxide gradually escapes from solution over the course of hours, without noticeably disturbing the physical structure of the beer in the opened package.

In some cases, however, carbon dioxide is rapidly evolved immediately on opening a container of beer. This rapid evolution of gas generates foam, and the foam so formed overflows, more or less violently, out of the container. This phenomenon is commonly termed gushing or overfoaming.

Gushing may vary in severity, ranging from a mild condition, in which a few milliliters of beer may gently overflow from an opened container, to severe gushing, in which a major fraction of the contents may be violently ejected from the container as a stream of foaming liquid.

From the point of view of the consumer, it is most undesirable that beer should gush. Gushing not only reduces the amount of beer available for consumption but, more importantly, is apt to shower both consumer and his environs with beer. Any brand of beer which gushes will soon lose favor with consumers, with an alarming effect on sales of that beer. It is imperative to the brewer that his product does not gush.

The basic causes of gushing are poorly understood. It is commonly believed that the major cause lies in some unknown variation in the barley used for malting. This belief is supported by the fact that gushing usually occurs in "epidemics," confined to certain locations in the same season. Other factors have been claimed to contribute to the causes of gushing, such as prolonged storage at low temperatures, vibration, oxidation, and calcium oxalate. Certain trace metals have also been blamed, but, on the other hand, traces of cobalt prevent gushing in some cases. While a number of remedies for gushing have been proposed, it is not difficult to find instances where these remedies are ineffective.

An object of this invention is to provide malt beverages free from the defect of gushing.

Yet another object of this invention is to provide a method for preventing gushing by use of a naturally occurring, edible material, non-toxic to human beings at all conceivable levels of use.

Still another object of this invention is the provision of a method whereby, during the manufacture of beer, an edible substance can be incorporated into the beer during any stage of production subsequent to fermentation, in order to prevent gushing.

We have found that the addition to beer of even traces of water soluble bile acids or their water soluble salts, as, for example, their sodium or potassium salts, are highly effective in eliminating gushing.

While bile itself can be used for the purposes of this invention, it is preferable to use a less complex mixture, since some of the constituents of bile may impart undesirable flavors to beer and may detract from its colloidal stability.

Bile extract, which is the fraction of bile soluble in aqueous alcohol, and which consists mainly of a mixture of bile acids, such as cholic and desoxycholic acids, conjugated with glycine and taurine, is effective for purposes of this invention. Particularly useful are ox bile extract or hog bile extract, or mixtures of the two, these being readily available materials of commerce. Individual bile acids, such as taurocholic acid, desoxycholic acid, lithocholic acid, glycocholic acid, dehydrocholic acid, or their water soluble salts, and the like, may also be used, the choice being dependent on commercial availability and cost of the particular acid, but, in general, bile extract is preferable because of its lower cost. All the aforementioned bile extracts and acids and their water soluble salts are tasteless in beer at the concentrations useful for this invention.

While the useful materials described in this invention may be added to beer at any stage in its manufacture, it is most economical to make the addition subsequent to fermentation, to avoid losses of anti-gushing activity due to precipitation or other causes. The bile extracts and acids and their water soluble salts may conveniently be added in aqueous solution though, if desired, they may be added in solid form and allowed to disperse in the beer.

The amount of bile extract or bile acid which need be added will depend on the particular nature of the beer to be treated; for example, the use of abnormal type malts may require more anti-gushing activity than if the usual grade brewing malt had been used. In general, even traces of the aforesaid bile extracts or bile acids or their water soluble salts are effective. Usually, suitable concentrations range from less than 2 to 3 p.p.m. to 50 p.p.m. of the beer treated. Frequently, no more than 5-10 p.p.m. is necessary. The exact amount to be employed is easily determined by one skilled in the art, by checking the tendency toward gushing of his particular beer.

The following examples will serve to illustrate the usefulness of this invention.

*Example I*

Beer A, packaged in 12 oz. bottles, was chilled, shaken, and opened; it gushed vigorously. On the average, 44 ml. was lost by overfoaming.

The same beer was treated in storage after fermentation with a 5% solution of ox bile extract. The concentration of ox bile extract in the beer was 3 p.p.m. The treated beer, when packaged and tested identically to the untreated beer, exhibited no gushing; no beer was lost on opening after chilling and shaking.

*Example II*

Beer B was packaged in 12 oz. bottles; after shaking and opening, on the average 27 ml. was lost by overfoaming.

Taurocholic acid was allowed to dissolve in the same beer, prior to final filtration. The concentration of taurocholic acid in the beer was 25 p.p.m. This treatment completely eliminated overfoaming after bottling, shaking and opening.

*Example III*

Beer C, packaged in 12 oz. bottles, was chilled, shaken, and opened. On the average, 23 ml. was lost by overfoaming.

The same beer was treated with a 10% aqueous solution of the sodium salt of glycocholic acid during cellar storage, to give a concentration of 10 p.p.m. in the beer. The treated beer, when packaged and treated identically to the untreated beer, exhibits no gushing; no beer overfoamed on opening after chilling and shaking.

We claim:
1. A method for inhibiting gushing in fermented malt beverages which comprises incorporating therewith a small but effective amount of a composition selected from the class consisting of bile, bile extract, bile acids and water soluble salts of the latter selected from the group consisting of their sodium and potassium salts.
2. A method for inhibiting gushing in fermented malt beverages which comprises incorporating therewith after fermentation a small but effective amount of a composition selected from the class consisting of bile, bile extract, bile acids and water soluble salts of the latter selected from the group consisting of their sodium and potassium salts.
3. A method for inhibiting gushing in beer which comprises incorporating therewith a small but effective amount of bile extract.
4. A method of inhibiting gushing in beer which comprises incorporating therewith after fermentation a small but effective amount of water soluble salts of bile acids selected from the group consisting of their sodium and potassium salts.

References Cited by the Examiner

UNITED STATES PATENTS

| 995,824 | 6/11 | Wallerstein | 99—31 |
|---|---|---|---|
| 2,938,795 | 5/60 | Kinsman et al. | 99—48 |
| 3,026,204 | 3/62 | Hoglan | 99—48 |

OTHER REFERENCES

Rudin et al.: Institute of Brewing Journal, vol. 64, 1958, pp. 317–318.

A. LOUIS MONACELL, *Primary Examiner.*